Dec. 5, 1950     C. E. SMITH     2,532,428
ELLIPTICAL POLARIZATION ELECTROMAGNETIC
ENERGY RADIATION SYSTEM
Filed Nov. 14, 1946     5 Sheets-Sheet 1

INVENTOR.
Carl E. Smith
BY
Hoodling and Krost
attys

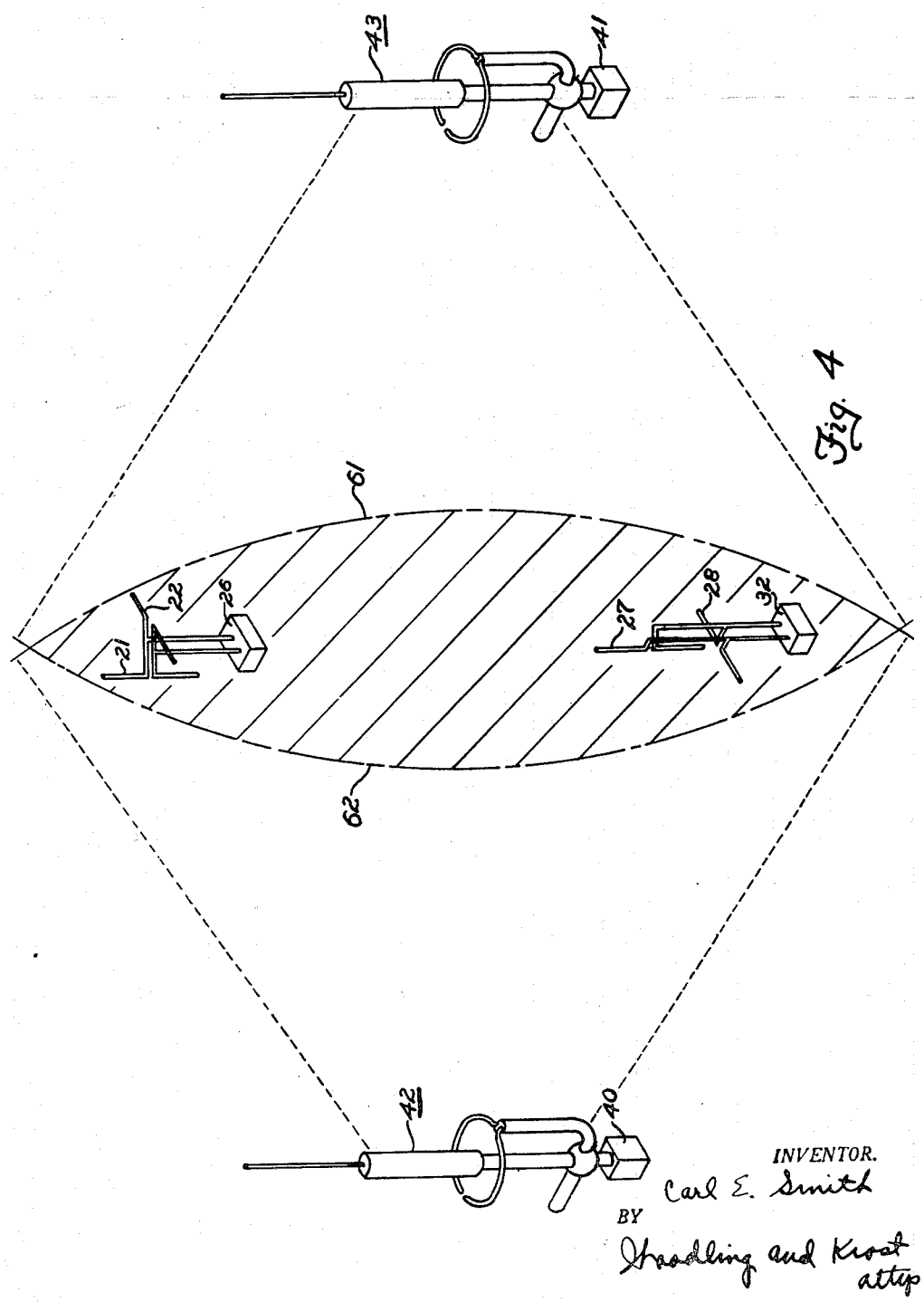

Dec. 5, 1950  C. E. SMITH  2,532,428
ELLIPTICAL POLARIZATION ELECTROMAGNETIC
ENERGY RADIATION SYSTEM

Filed Nov. 14, 1946  5 Sheets-Sheet 4

INVENTOR.
Carl E. Smith
BY
Woodling and Krost
atty.

Dec. 5, 1950
C. E. SMITH
2,532,428
ELLIPTICAL POLARIZATION ELECTROMAGNETIC
ENERGY RADIATION SYSTEM
Filed Nov. 14, 1946
5 Sheets-Sheet 5

INVENTOR.
BY Carl E. Smith
Shoodling and Kent
attys.

Patented Dec. 5, 1950

2,532,428

UNITED STATES PATENT OFFICE 2,532,428

ELLIPTICAL POLARIZATION ELECTROMAGNETIC ENERGY RADIATION SYSTEM

Carl E. Smith, Cleveland, Ohio, assignor of one-half to United Broadcasting Company, a corporation of Ohio Application November 14, 1946, Serial No. 709,737

12 Claims. (Cl. 343—100)

My invention relates in general to polarization of radiated waves, and more particularly to the limiting cases of circular and plane polarization of the general case of elliptical polarization of radiated electromagnetic waves.

The term "circular polarization" as used in this description, means the limiting case of elliptical polarization of the electromagnetic field in a plane at right angles to the direction of propagation. In this plane the electric vector is of constant amplitude and rotates at the carrier frequency in a clockwise or counter-clockwise direction.

The term "plane polarization" as used in this description, means the other limiting case of elliptical polarization of the electromagnetic field wherein the wave energy is polarized in a plane parallel to the direction of propagation. In this case the electric vector is of varying amplitude and does not rotate as in the case of "circular polarization."

The term "electromagnetic field" is understood to contain an electric field and a magnetic field in planes which are at right angles and the energy therein contained is constant and continuously changes from one form to the other. For the purpose of the following description and claims, the term wave polarization" will refer only to the electric field.

An object of my invention is to provide a method of transmitting radiated energy wherein a maximum number of receivers within a given service area will receive the radiated energy at least at a given minimum signal level regardless of the orientation of a single straight dipole receiving antenna in a plane perpendicular to the line of propagation of the radiated wave energy.

Another object of my invention is the provision of a radiation system for establishing elliptical polarization, with circular and plane polarization as the two limiting cases, at least at the marginal area or near the boundary of a given area which surrounds the radiator means.

Another object of my invention is the provision of a radiation system for establishing substantially non-directional elliptical polarization, with substantially non-directional circular and plane polarization as the two limiting cases.

Another object of my invention is a radio system comprising two or more radio transmitters and at least a radio receiver wherein means are provided at the radio receiver for discriminating between clockwise or counter-clockwise rotational directions of the circularly polarized energy waves of the two or more radio transmitters.

Another object of my invention is the provision of a radiation system for establishing substantially non-directional plane polarization in other than a horizontal or vertical plane.

Another object of my invention is a radio system comprising two or more radio transmitters and at least a radio receiver wherein means are provided at the radio receiver for discriminating between the plane polarized waves radiated from the transmitters.

Other objects and a fuller understanding of my invention may be had by referring to the following description and claims, taken in conjunction with the accompanying drawing, in which:

Figure 5:
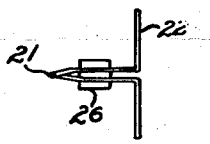
Figure 7:
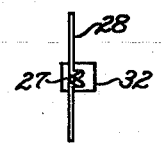
Figure 6:
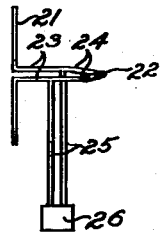
Figure 8:
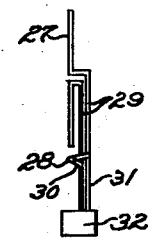
Figure 11:
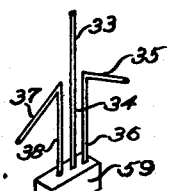
Figure 9:
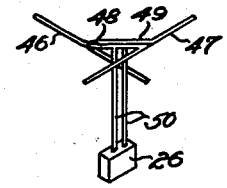
Figure 12:
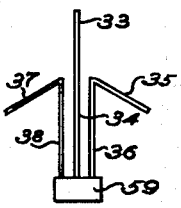
Figure 10:
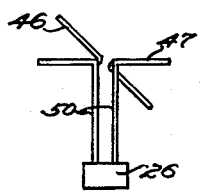
Figure 16:
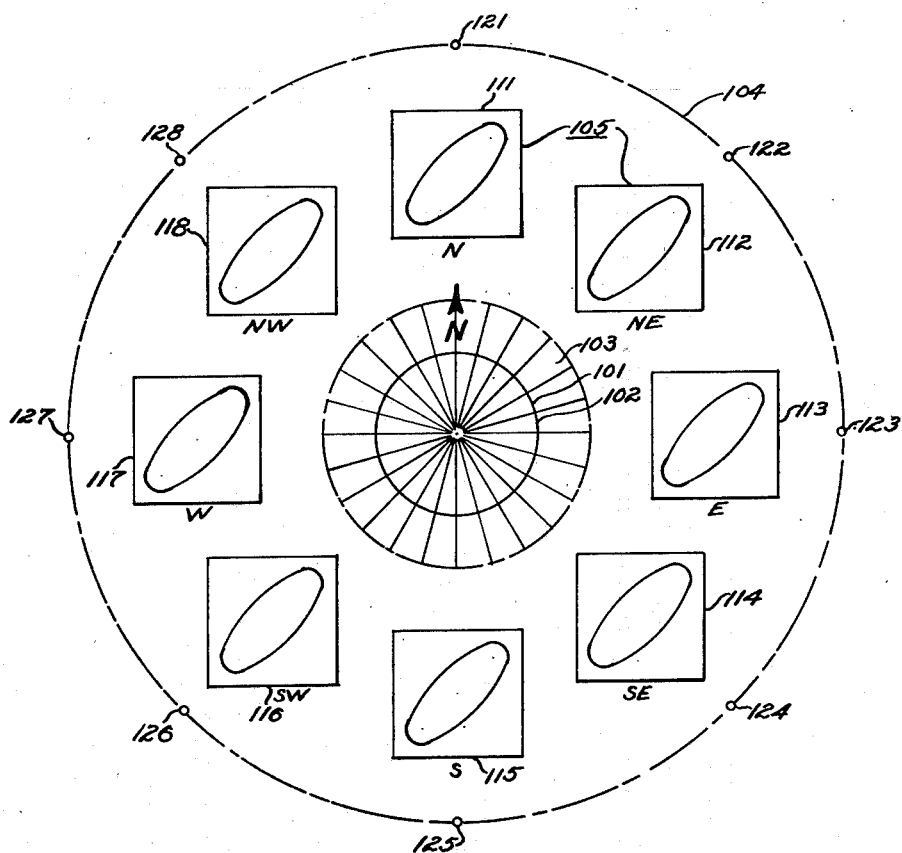
Figure 13:
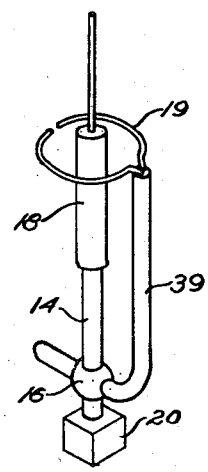
Figure 14:
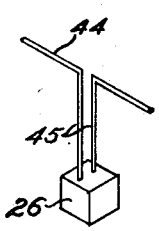
Figure 15:
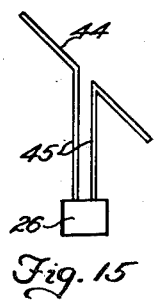
Figure 17:
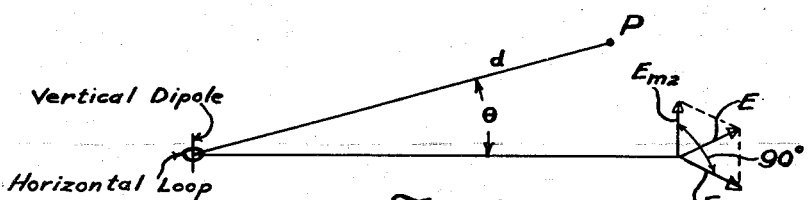
Figure 18:
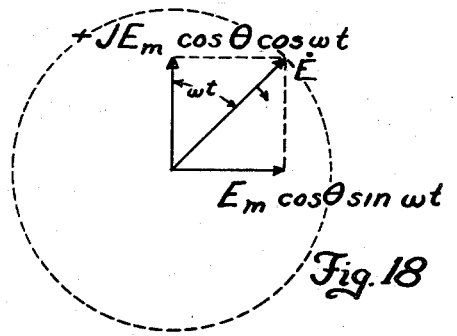
Figure 19:
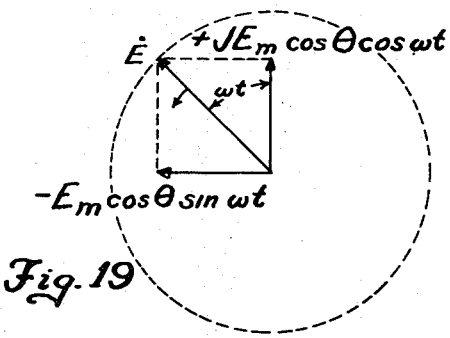
Figure 20:
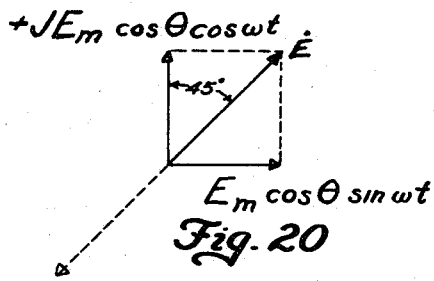
Figure 21:
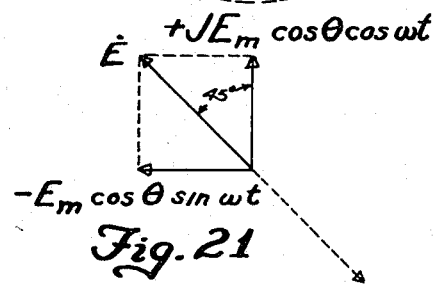
Figure 22:
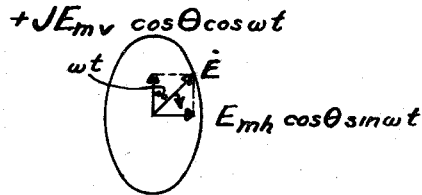
Figure 23:
Figure 24:
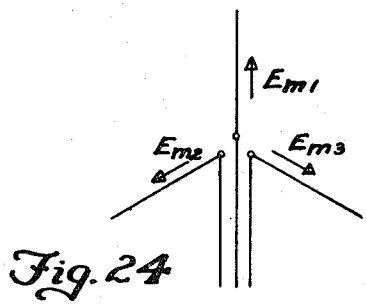

Figure 4 diagrammatically shows in perspective two radio receiving sets positioned within the overlapping service areas of two radio transmitting stations;

Figure 5 is a diagrammatic plan view of a receiving antenna designed to receive or transmit elliptically polarized waves;

Figure 6 is a diagrammatic side elevation of the receiving antenna shown in Figure 5;

Figure 7 is a diagrammatic plan view of another type of receiving antenna, designed for use with elliptically polarized waves;

Figure 8 is a diagrammatic side elevation of the antenna shown in Figure 7;

Figure 9 is a diagrammatic perspective view of another type of receiving antenna designed to receive elliptically polarized waves;

Figure 10 is a diagrammatic side elevation of the antenna shown in Figure 9;

Figure 11 is a diagrammatic perspective view of still another type of antenna designed to receive elliptically polarized waves;

Figure 12 is a diagrammatic side elevation of the antenna shown in Figure 11;

Figure 13 is a perspective view of an antenna system designed to produce non-directional diagonal plane polarized energy waves;

Figure 14 is a diagrammatic perspective view of a type of antenna designed for use with diagonal plane polarized waves;

Figure 15 is a diagrammatic side elevation of the antenna shown in Figure 14; and Figure 16 shows the performance patterns of the field intensity for non-directional elliptical polarization;

Figure 17 is a sketch showing vector fields produced by an antenna producing an elliptically polarized field intensity as governed by Equation 2;

Figure 18 is a sketch showing a circularly polarized vector E which rotates clockwise of a special two-element antenna which is governed by Equation 3.;

Figure 19 is a sketch showing a circularly polarized vector E which rotates counter-clockwise of the special two-element antenna as governed by Equation 4;

Figure 20 is a sketch showing a 45 degree polarized vector E as governed by Equation 5;

Figure 21 is a sketch showing a —45 degree polarized vector E as governed by Equation 6;

Figure 22 is a sketch showing an elliptically polarized vector E with the major axis vertical;

Figure 23 is a sketch showing an elliptically polarized vector E with the major axis horizontal; and Figure 24 is a sketch showing a three-element circularly polarized antenna as governed by Equation 7.

Generally my invention relates to methods of radiating electromagnetic energy, with particular emphasis on the methods and a system for improving the reception of radio waves by a radio receiving set. In many instances, service areas or boundaries for certain radio transmitter types and frequencies have been established, for instance, in the United States by the Federal Communications Commission, and my invention has particular reference to improving the reception of the transmitted wave energy within these service areas. My invention materially increases the possibility that a receiving antenna located at random in space will provide satisfactory receptions.

To achieve the end of increasing the possibility of satisfactory reception with a randomly placed receiving antenna, my invention provides for the transmission of a circularly polarized wave energy, which is a specialized case of elliptical polarization. In actual practice, circular polarization is difficult to attain, due to many varying and unpredictable factors; however, by correct design, circular polarization may be attained as closely as desired.

Figure 1:
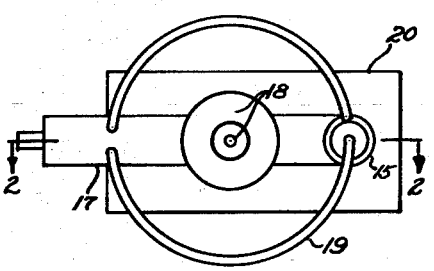
Figure 1 is a plan view of a radiating antenna that produces elliptically polarized waves.
Figure 2:
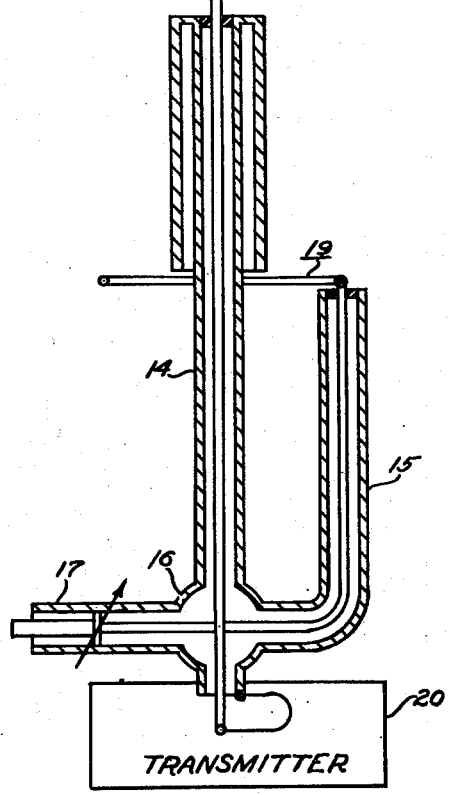
Figure 2 is a sectional side view of the antenna taken on the line 2—2 of the Figure 1.

With reference to the drawing, Figures 1 and 2 depict a simple type of transmitting antenna which is designed to produce circular polarization of the radiated waves. In Figures 1 and 2, the reference character 18 generally represents a vertical antenna or radiator means and 19 generally represents a horizontal antenna or radiator means. The vertical antenna 18 is a common half-wave center-fed dipole, or coaxial antenna, and the horizontal antenna 19 is a dipole loop, which is circular in a horizontal plane, as shown in Figure 1. A transmitter 20 supplies energy to both the horizontal and vertical antennas through the transmission lines 14 and 15 respectively, which in the drawing are shown as coaxial cables. A junction box 16 in the transmission line is used to couple both the vertical and horizontal antennas to the transmitter 20. A tuning stub 17 is provided at the junction box to provide a tuning arrangement in the transmission line to match the impedance of the transmission line to the impedance of the transmitter 20, and other tuning stubs may be placed in the transmission lines 14 and 15 if desired. The transmission line 14 that feeds the vertical antenna 18 is made one-quarter wave length longer than the transmission line 15 that feeds the horizontal antenna 19, in order to provide a 90 degree difference of electrical phase between the two antennas 18 and 19. The vertical dipole 18 has a theoretically circular horizontal pattern of field intensity or energy level, and the horizontal antenna 19, being a dipole loop, also has a theoretically circular horizontal pattern of field intensity or energy level. The two antennas 18 and 19 are axially aligned to prevent distortion of the respective field intensity patterns by the other antenna. The effect of these two circular horizontal patterns from these two antennas 18 and 19 is to tend to cause equal radiation of the horizontally and vertically polarized energy waves or field intensity in all horizontal directions; therefore the antenna as shown is non-directional in a horizontal plane. The 90 degree electrical phase difference between the two antennas 18 and 19 causes a rotating electrical vector which rotates in free space at the carrier frequency as it is propagated; that is, one revolution of the electric vector for each wave length traversed along the line of propagation. This transmitting antenna will transmit circularly polarized waves, if each antenna is fed with an equal amount of energy. Positioning a transmitter with an antenna of this type near the center of a substantially circular service area would enable substantially circular polarization of the energy waves to be established fairly easily throughout the service area.

A single straight dipole half wave receiving antenna may efficiently be utilized to receive these circularly polarized waves and a novel feature of my invention resides in the fact that this receiving antenna may be positioned at random in a plane perpendicular to the line of propagation and yet receive a substantially constant voltage.

Figure 3:
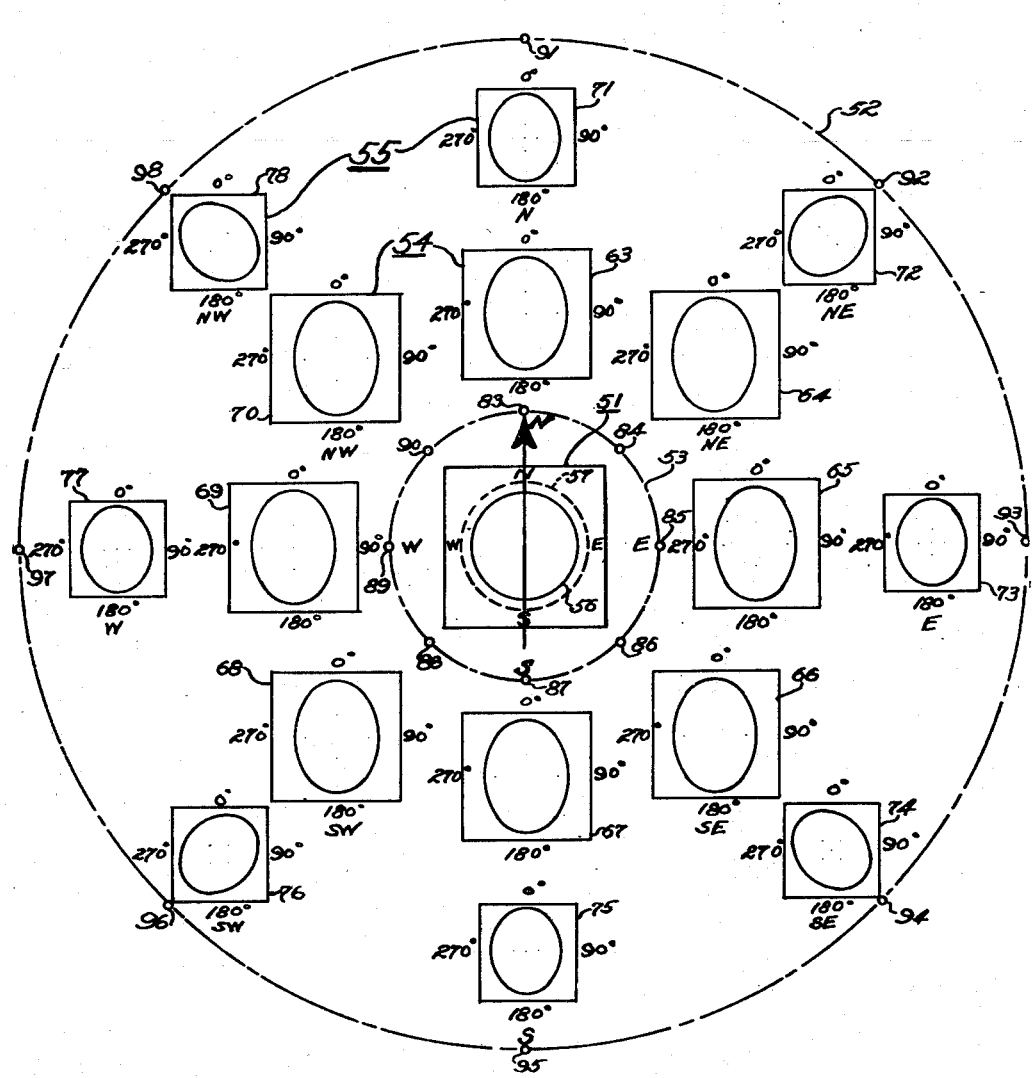
Figure 3 shows the performance patterns of the field intensity at given points within a specified service area for circular polarization.

Referring to Figure 3, I show performance patterns of an antenna system such as is shown in Figures 1 and 2 for radiating circularly polarized energy waves. In the center of Figure 3, I show the horizontal plane pattern 51 of the vertically and horizontally polarized waves. This horizontal plane pattern has been oriented with north at the top of the page and shows two substantially circular patterns, a first pattern 56 which is a solid line for the horizontal polarization field intensity, and a second pattern 57 which is a dotted line for the vertical polarization field intensity. I have shown two dash-dot circles in the Figure 3. The outer dash-dot circle 52 is to depict the boundary or marginal area of a given service area, such as for instance, a service area as allocated by the Federal Communications Commission, as that area within which a given radio transmission station has been authorized to serve at a given frequency and at a given minimum signal level of field intensity. The smaller dot-dash circle 53 is meant to represent an arbitrary boundary within the given service area also surrounding but nearer the radio transmitter station. A first set 54 of eight polarization patterns 63 to 70, inclusive, is shown just outside the first small dot-dash circle, and a second set 55 of eight more polarization patterns 71 to 78 inclusive, is shown just inside the large outer dot-dash circle. These patterns 63 to 78 inclusive, give the relative field intensity in the horizontal plane of a straight dipole receiving antenna for all polarizations in a vertical plane normal to the direction of propagation at points 83 to 98 inclusive, on the two circles 52 and 53.

The points 83 to 98 are numbered twenty numbers higher than the corresponding patterns 63 to 78, inclusive, for that point. The horizontal plane pattern 51 in the center of Figure 3 shows that the vertical antenna means has been energized at a relatively higher energy level than the horizontal antenna means. A feature of my invention pertains to methods for causing the field intensity patterns in the marginal area or near the boundary 52 of the given service area to be relatively circular, as depicted by the second set of patterns 55 near the large dash-dot circle 52. These patterns, 71 to 78 inclusive, for the relative field intensity, have been shown as roughly circular. Figure 3 illustrates that it may often be necessary to energize the horizontal and vertical antenna means of the transmission station at different energy levels, because of different attenuation factors or other varying factors in these two types of polarized waves, so that a fairly circular field intensity pattern will be established in the marginal area of the given service area. In many cases, the attenuation factor of each of the horizontal and vertically polarized energy waves might be substantially the same, in which case the vertical and horizontal radiator or antenna means would be energized at approximately the same energy level, maintaining a substantially circular field intensity pattern throughout the entire service area.

It is a feature of my invention that the field intensity polarization patterns shall be as circular as possible in the marginal area of the service area, as shown by the set of patterns 55 in Figure 3. In many cases the attenuation factors or degree of reflection or other varying factors may be different for the horizontal and vertical waves, and it may be necessary to energize one antenna means at a higher energy level than the other. With this condition, locations closer to the transmitter station than the marginal area or boundary will have a higher field intensity, as shown by the larger area of the polarization patterns 54. With unequal energization of the two antenna means, these polarization patterns 54 will tend to become elliptical, because the field intensity in either the vertical or horizontal plane will be amplified more than the other, to become the major and minor axes of the ellipse. The minor axis of the ellipse of the patterns 54 will still be considerably greater than the diameter of the roughly circular polarization patterns 55, and if a straight dipole receiving antenna is aligned with the minor axis of the ellipse of the patterns 54, the signal strength received will still be considerably above that minimum signal strength required for good reception. When the attenuation factor and other variables for each of the vertically and horizontally polarized waves are equal, the energization of each antenna will be equal, or 50 per cent of the transmitter power to each antenna. Where the variable factors cause a difference in the field intensity, different amounts of energy would be applied to each antenna means to cause a difference in the field intensities at and near the transmitter, which produces a circular polarization of the field intensity at the marginal area. I find that the limits of variations in the field intensity need not exceed 30 per cent to 70 per cent; that is, each antenna need be energized to produce a field intensity of a minimum of 30 per cent, or a maximum of 70 per cent, with the other antenna being supplied with the remaining transmitter power. This limit of variations has been found to be sufficient to cause circular polarization at the marginal area with even great unbalance of the variable factors. The ratio of the field intensity produced by each antenna will therefore be a function of the attenuation factor of the wave energy in that plane of polarization.

Another novel feature of my invention provides for means for selecting between two or more transmitters that have overlapping or adjacent service areas as illustrated in Figure 4, by providing means at the receiving station which is within the overlapping portions of these areas or near the boundary between adjacent areas, for discriminating between one or the other at will. To provide for this, I employ a receiving antenna that will receive a circularly polarized wave, and by proper phasing, circularly polarized waves of either clockwise or counter-clockwise rotational direction may be received, while the other is rejected or eliminated.

In Figure 4, I illustrate diagrammatically first and second radio transmitter stations 40 and 41 which have antenna systems 42 and 43, respectively. A first dot-dash circle 61 depicts the boundary or marginal area of the given service area of the first radio transmitter 40, and a second dot-dash circle 62 similarly depicts the marginal area of the second radio transmitter 41. A first and a second radio receiving set 26 and 32 each having a different type of antenna system have been shown within the overlapping portions of the two service areas, to illustrate two forms of antenna systems to discriminate between circularly polarized waves radiated from the two radio transmitter stations 40 and 41. The method of operation of these two types of antenna systems, and other antenna systems designed to receive circularly polarized wave energy, will more readily be understood by referring to the Figures 5 to 12. The antenna shown in perspective view in conjunction with the radio receiving set 26 in Figure 4 is the same as that shown in Figures 5 and 6, and the antenna shown in perspective view in conjunction with the radio receiving set 32 in Figure 4 is the same as that shown in Figures 7 and 8.

Figure 5 is a top or plan view, the Figure 6 is a side view of one type of antenna that will receive circularly polarized energy waves. The representations of this antenna as shown in Figures 5 and 6 are merely pictorial sketches, and the physical support elements are not shown. The reference characters 23 and 24 denote the transmission lines or coaxial cables that feed the vertical and horizontal half-wave dipoles 21 and 22, repectively, and 25 is the common transmission line to the radio receiving set 26. The length of the transmission lines 23 and 24 are each one-eighth wave length long, therefore placing the two antennas 21 and 22 a quarter wave length apart in a horizontal plane. This antenna must be properly oriented as to direction to the transmitting station, with the line formed by the transmission lines 23 and 24 pointing toward the transmitting station. This is necessary so that there is one-quarter wave length difference in distance to the transmitter station from the horizontal and vertical antennas and a ninety-degree phase difference is produced in the two antennas thereby. This ninety degree difference in electrical phase between the horizontal and the vertical receiving antennas and an equal length of transmission line into the radio receiving set will enable this antenna system to receive circularly polarized energy waves. This antenna system will receive circularly polarized energy waves from either of two directions, that is, for instance in Figure 4, from either the transmitter 40 or 41. However, dependence is made upon the manner of phasing the two antennas 21 and 22 in order to determine whether clockwise or counterclockwise rotational direction of the circularly polarized waves will be received or rejected. For purposes of illustration, let us assume the transmitter station 40 is transmitting circularly polarized waves which are rotating clockwise as viewed by an observer looking away from the transmitter station 40. This clockwise rotational maximum vector is intercepted by the vertical receiving antenna 21, and at the same instant of time a maximum field intensity vector will be received by the horizontal receiving antenna 22. If the connections are such that the voltage received by the two antennas 21 and 22 are additive, then twice the signal strength received by one antenna alone is supplied to the radio receiving set 26. If the connections are so made that the signal voltages received by the two antennas oppose each other, theoretically there will be no signal supplied to the radio receiving set 26. With such a connection, clockwise rotating waves would be rejected and counter-clockwise rotating waves would be accepted. It will be noted that if the entire antenna assembly is rotated 180 degrees in a horizontal plane, so that the horizontal receiving antenna 22 is closer to the transmitter station than the vertical receiving antenna 21, there will be no difference as to the type of rotational wave energy that is accepted or rejected.

Figure 7 is a plan view and Figure 8 is a side view of another type of receiving antenna designed to receive circularly polarized waves, and the theory of its design is quite similar to the theory of the design of the antenna shown in Figures 5 and 6. The antenna as shown in Figures 7 and 8 has a vertical receiving antenna 27 and a horizontal receiving antenna 28. The vertical receiving antenna 27 is connected to a length of transmission line 29, and the horizontal receiving antenna 28 is connected to a length of transmission line 30. A common transmission line 31 joins the two transmission lines 29 and 30 to the radio receiving set 32. In this antenna system, the two receiving antennas 27 and 28 are equidistant from the transmitter station, inasmuch as they are in the same plane. However, the transmission line 29 is made a quarter wave length longer than the transmission line 30 and therefore circularly polarized waves may be received on this antenna system as well. For purposes of illustration, we shall assume a similar situation as was assumed for the antenna system of the Figures 5 and 6, wherein the transmitter 40 is transmitting a circularly polarized wave having a clockwise rotational direction as viewed by an observer looking away from the transmitter station. With proper connections of the horizontal and vertical receiving antennas to the transmission line 31, clockwise or counter-clockwise rotational direction of wave energy may be selected. With this particular type of antenna system, a rotation of the antenna system 180 degrees in the horizontal plane does make a difference in the receiving characteristics, in that if it was formerly receiving clockwise rotating waves, it will now reject these waves and receive counter-clockwise rotating waves from that particular direction.

It is intended as fully within the scope of my invention in the disclosure that the two dipole receiving antennas need not be in a vertical and a horizontal plane, respectively, but may be positioned at any other angle in space as long as the two bear a ninety degree physical relationship to each other. It is also to be understood that the antennas may be at some other physical angle than ninety degrees, such as for instance, at 45 degrees if the difference in length of the transmission line or difference in length of the line of propagation to the radio transmitter is correspondingly changed, that is, to an eighth-wave length difference rather than a quarter wave length difference.

Figure 9 depicts a perspective view and Figure 10 a side elevation of still another type of antenna, in which 26 again denotes a radio receiving set, 46 is a dipole at a 45 degree angle to the horizontal, and 47 is a horizontal dipole. A common transmission line 50 joins the radio receiver 26 to two short transmission lines 48 and 49. The short transmission line 48 joins the 45 degree angle dipole 46 to the common transmission line 50, and the short transmission line 49 joins the horizontal dipole 47 to the common transmission line 50. Both the short transmission lines 48 and 49 are each a sixteenth wave length long, thereby spacing the two dipoles 46 and 47 an eighth wave length apart in space. Upon proper phase connections and orientation in the direction of the transmitting station, the antenna system will receive circularly polarized wave energy, because the length of the transmission lines are equal, and the electric vector of the radiated wave will have rotated 45 degrees in space after being intercepted at its maximum value by the dipole 46, to be again intercepted by the dipole 47 also at its maximum value. The antenna system illustrated in Figures 9 and 10 is similar in directional and phase characteristics to the antenna shown in Figures 5 and 6, inasmuch as it will receive counter-clockwise rotating waves from either of two orientations, and requires a change of phase connection to receive clockwise rotating waves from either direction of orientation.

Figures 11 and 12 show another type of antenna system designed to be responsive to circular polarization, and has three dipoles in a vertical plane each bearing a 120 degree relationship to any other. A vertical antenna 33 is connected by a transmission line 34 to a radio receiver 59. A first oblique antenna 35 is connected by a transmission line 36 to the radio receiver 59. A second oblique antenna 37 is connected by a transmission line 38 to the radio receiver 59. The three antennas 33, 35 and 37 are then connected 120 degrees apart in electrical phase to be responsive to a circularly polarized field. This antenna system will have a bi-directional characteristic. The receiver 59 must necessarily have input means designed to receive this energy, which is commonly designated as a three phase feeding or coupling system. This antenna can also be used for bi-directional transmission of circularly polarized waves.

The antenna system illustrated in Figures 11 and 12 is similar to the antenna shown in Figures 7 and 8 in direction and phase characteristics, inasmuch as it will receive clockwise rotating waves from a radio transmitter when properly oriented and connected in phase, and simultaneously is capable of receiving counter-clockwise rotating waves from an oppositely positioned radio transmitter. A correct phase connection and a correct orientation in one direction only, not merely in one of two opposite directions, is necessary to receive any given rotational direction of circularly polarized waves from any given radio transmitter.

The mode of operation of any of these types of antenna systems as shown in the Figures 5 to 12 will now be more fully described as to their application to the Figure 4. As hereinbefore described, the antenna system used in conjunction with the radio receiver set 26, when correctly aligned and phased, will receive only clockwise rotational direction of energy waves and reject the counterclockwise rotating waves. This antenna system for the radio receiver 26 will receive clockwise rotational direction of antenna waves from either of two directions, that is, as shown in Figure 4 from either the transmitter 40 or transmitter 41. To provide for discrimination between two types of circular polarization, if the radio transmitter 40 is transmitting circularly polarized energy waves having a clockwise rotational direction as previously described, and the radio transmitter at 41 is transmitting circularly polarized energy waves having a counter-clockwise rotational direction, then the antenna system used in conjunction with the radio receiver 26 would discriminate between the two, rejecting the counter-clockwise rotational direction of energy waves from the radio transmitter 41, and receiving those energy waves of a clockise rotational direction from the transmitter 40. In another case, both the transmitters 40 and 41 might be transmitting circularly polarized energy waves of the same rotational direction, for instance, a clockwise rotational direction. In this case, an antenna system as used with the radio receiver 32 would discriminate between the two. The theory of operation of this type of antenna has previously been described, and it has been shown that with correct connection of the two antenna means 27 and 28 to the transmission line, the alignment of the entire antenna system is the deciding factor as to whether clockwise rotational direction of energy waves would be received from either the radio transmitter 40 or 41. To receive the wave energy from the radio transmitter 40, the position of the antenna system of the radio receiver 32 might be as shown in the drawing, and if so, to receive the wave energy from the radio transmitter 41 and reject the wave energy from the radio transmitter 40, only the antenna system of the radio receiver 32 need be rotated 180 degrees in the horizontal plane.

For either of the two antenna systems as shown in use with the radio receivers 26 and 32 another method is possible for receiving wave energy of either rotational direction from either of the two radio transmitters 40 or 41, and that is to provide a switching means or connection means of the transmission line so that the phase of the connection may be changed, and as hereinbefore described this will change the type of the rotational wave energy that is received.

Discrimination between clockwise and counterclockwise rotating circularly polarized waves is based on the same principle regardless of the type of receiving antenna. The receiving antenna systems shown in Figures 5 and 9 do not have the two dipoles in the same plane normal to the line of propagation, yet have the same length of lead-in transmission line. The antenna systems shown in Figures 7 and 11 have the dipoles in the same plane and either have different lengths of lead-in transmission lines or different phase connections in the transmitter. The phase connections must be correct in either case, that is, the voltage received by each antenna must be additive. The underlying principle is that with any type of antenna system, the total length of the path of the propagated wave must compensate for the 90 degrees difference in electrical phase of the transmitted or radiated wave. For the type of antenna system shown in the Figures 5 and 9, the phase difference is compensated for in a quarter wave length or eighth wave length difference in the length of the free-space distances from the transmitter antenna to the vertical and horizontal dipoles. For the type of antenna systems shown in Figures 7 and 11, the phase difference is compensated for by the quarter wave length difference in the length of the lead-in transmission lines or the coupling arrangement. Combinations of these two types may also be effected, such as an eighth wave length difference in free space between the two dipoles, and an additional eighth wave length difference in the lengths of the lead-in transmission lines. Other combinations are also feasible, such as might be obtained by modifications of the antenna system shown in Figure 9, wherein the dipoles are only physically displaced 45 degrees, and have a separation in free space to correspond, that is, only an eighth wave length, rather than a quarter wave length. This antenna system could easily be modified to come under the second type of antenna systems illustrated in Figures 7 and 11. This could be accomplished by placing the two dipoles in the same plane normal to the line of propagation, and making an eighth wave length difference in the length of the lead-in transmission lines. In general, all these various modifications have the same basis, a compensation for the phase difference between the waves radiated by the two antenna means of the transmitter.

While I have described in Figures 1 and 2 merely a simple form of transmitter antenna that is designed to transmit or receive circularly polarized wave energy, it is within the scope of my invention that other forms of antenna means or radiator means may be employed to radiate or transmit such circularly polarized energy waves. For instance, the antenna system shown in Figures 5 and 6 has been described as being capable of receiving circularly polarized energy waves in two diametrically opposite directions. It is obvious that this antenna system may therefore also be used for transmission of circularly polarized energy waves as well as the reception of these waves. The antenna systems shown in Figures 7, 9 and 11 are likewise capable of transmitting circularly polarized energy waves. The antenna systems shown in the Figures 1 and 5 to 12 might be used at any other position in space, for instance, these receiving antennas might be tilted 60 degrees from their present position so that only a portion of the energy will be intercepted and yet at each position the receiving dipoles will still bear the same relationship to each other.

Another feature of my invention is to provide substantially non-directional plane polarization, which in the prior art has been impossible with only one radiator means, with the exception of the plane polarized waves in either a horizontal or a vertical plane. An antenna system to produce this diagonal plane polarization wave, as it may be called, is shown in Figure 13. The antenna system shown in Figure 13 is a modification of the antenna system shown in Figures 1 and 2, wherein 18 again represents a vertical antenna means, and 19 represents a horizontal dipole loop. A transmitter 20 again feeds both radiator means, the vertical antenna means 18 being fed through transmission line 14 from the junction box 16, and the horizontal antenna means 19 is fed through a transmission line 39 from the junction box 16. The significant difference between this antenna system and that shown in Figures 1 and 2, is that the length of the transmission line 39 which feeds the horizontal dipole loop 19 is made equal to the length of the transmission line 14 that feeds the vertical antenna means 18. This achieves the result that both antenna means 18 and 19 are now in phase, and the resultant electric vector produced by the two antenna means will be the vectorial sum of the two antenna means. As I have shown the system in Figure 13, the two radiator means would be fed with equal amounts of energy, and therefore the diagonal plane polarization would be at a 45 degree angle. A novel feature of this system is that this diagonal plane polarization is non-directional in the horizontal plane. This antenna system will produce diagonal plane polarization that is non-directional, that is, will have a constant angular position as seen by an observer regardless of position from the antenna system. The two antenna means could easily be energized at other than equal magnitudes, in which case the diagonal plane of polarization would be other than 45 degrees, but would still be the resultant vector sum of the two field intensity vectors.

In Figures 14 and 15 is shown a type of receiving antenna system that is designed to receive diagonal plane polarized waves. The antenna system shown has an antenna means 44 connected by a transmission line 45 to a radio receiving set 26. The antenna means 44 is positioned at a 45 degree angle with respect to the horizontal, and is slanted upwardly to the left as viewed from the right hand side of the drawing. The reception of diagonal plane polarized waves is dependent on the phase connection of the transmitting antenna means 18 and 19, and if the phase connection is such that the diagonal plane of polarization is upward to the left as viewed from the right side of the drawing, then the receiving antenna system shown in Figure 14 will receive the diagonally plane polarized waves transmitted by the antenna system of Figure 13.

If the phase connections of the transmitting antenna system of the Figure 13 were reversed, then the antenna system shown in Figure 14 would not receive this energy radiation, because the diagonal plane of polarization would be at right angles to that plane of polarization which the antenna system of Figure 14 will accept. By rotating the antenna system shown in Figure 14 90 degrees in a vertical plane, or 180 degrees in a horizontal plane, would again enable this receiving antenna system to accept the radiated energy from the antenna system of Figure 13.

The aforementioned description as to the phase connection importance in the diagonal plane polarization of waves, is the basis for understanding another novel feature of my invention wherein diagonally plane polarized waves of two or more transmitter stations may be selected or rejected by a receiving station located in or near the overlapping area of the given service areas of the respective transmitter stations. The explanation for this selection or rejection would be quite similar to the explanation already given for that of Figure 4. Selection between two or more transmitter stations can be achieved by having an antenna system similar to that shown in Figure 14, which is rotatable in a vertical plane or preferably in a horizontal plane, and then the transmitted waves that are desirous of being received can be selected by proper orientation of the receiving antenna system.

The antenna system shown in Figures 1 and 2 will produce non-directional circular polarization, and the antenna system shown in Figure 13 will produce non-directional diagonal plane polarization, which are the limiting cases of non-directional elliptical polarization. In Figure 16, performance patterns of the general case of non-directional elliptical polarization are shown. Performance patterns shown in Figure 16 are quite similar in general character to those performance patterns shown in Figure 3. In the center of Figure 16 is shown the horizontal plane pattern 103 of the vertically and horizontally polarized waves. This horizontal plane pattern has been oriented with north at the top of the page and shows two substantially circular patterns, a first pattern 101 which depicts the horizontal polarization field intensity, and a second pattern 102 which depicts the vertical polarization field intensity. Since I have chosen to show equal relative magnitudes of energization of the two antenna means, these two patterns of the horizontal and vertically polarized field intensity are coincident. A recurrent line 104 depicts the boundary of a given service area, and a set of eight polarization patterns 105 give the relative field intensity pattern in the horizontal plane of a straight dipole receiving antenna for all polarizations in a plane normal to the line of propagation at equi-spaced points on the boundary 104. The set of eight polarization patterns 105 are consecutively numbered from 111 to 118, and represent the polarization patterns at the points 121 to 128 on the boundary 104. The polarization pattern for the given point is ten units lower in number than the corresponding point on the boundary 104. The set of eight polarization patterns 105 all show an elliptical pattern with the major axis sloping upwardly toward the right and therefore show that the elliptically polarized wave is non-directional in a horizontal plane.

For a theoretical point source radiator of elliptically polarized waves the instantaneous vector field intensity in free space can be written $$\dot{E} = \dot{E}_{m1}f_1(\theta,\phi) \sin(\omega t + \psi_1) + \dot{E}_{m2}f_2(\theta,\phi) \sin(\omega t + \psi_2) + \ldots + \dot{E}_{mk}f_k(\theta,\phi) \sin(\omega t + \psi_k) + \ldots + \dot{E}_{mn}f_n(\theta,\phi) \sin(\omega t + \psi_n)$$
(1)

$$= \sum_{k=1}^{k=n} \dot{E}_{mk}f_k(\theta,\phi) \sin(\omega t + \psi_k) \quad (1a)$$

where $E = mv/m$, the instantaneous total vector field intensity measured at a distance $a$ in a plane at right angles to the direction of propagation, $\dot{E}_{mk} = mv/m$, the maximum vector field intensity produced by the $k^{\text{th}}$ radiating element and measured at a distance $a$ in a plane at right angles to the direction of propagation, $f_k(\theta,\phi)$ = the radiation characteristic of the $k^{th}$ radiating element,
$\theta$ = elevation angle from a reference plane,
$\phi$ = azimuth angle on reference plane,
$\omega$ = the angular velocity in radians per second,
$t$ = time in seconds,
$\psi_k$ = time phase angle of $\dot{E}_{mk}$.

It is possible to use more than one point source radiator to produce elliptically polarized waves. In such cases it is feasible to use a number of point source radiators, some contributing one component and some another component, the sum of which at a point $a$ in space will add vectorially to produce the desired elliptically polarized field intensity.

For the special case of a vertical dipole and a horizontal loop having the same center of gravity in space as shown in Figures 1, 2 and 17 we can write the following equation for their instantaneously elliptically polarized field intensity in space, $$\dot{E} = \dot{E}_{mh} f_h(\theta,\phi) \sin(\omega t + \psi_h) + \dot{E}_{mv} f_v(\theta,\phi) \sin(\omega t + \psi_v) \quad (2)$$

where $\dot{E}_{mh} = mv/m$ the maximum vector field intensity produced by the horizontal loop antenna in the horizontal plane measured at a distance $a$ in a plane at right angles to the direction of propagation, $f_h(\theta,\phi) = \cos\theta$, the vertical radiation characteristic of an infinitesimal horizontal loop antenna. Since the pattern is non-directional in the horizontal plane the variable $\phi$ does not appear in the equation, $\theta$ = elevation angle from horizontal plane,
$\psi_h$ = time phase angle of the horizontal vector field intensity $\dot{E}_{mh}$, $\dot{E}_{mv} = mv/m$, the maximum vector field intensity produced by the vertical dipole in the horizontal plane measured at a distance $a$ in a plane at right angles to the direction of propagation, $f_v(\theta,\phi) = \cos\theta$, the vertical radiation characteristic of an infinitesimal vertical dipole antenna. Since the pattern is non-directional in the horizontal plane the variable $\phi$ does not appear in the equation, $\psi_v$ = time phase angle of the vertical vector field intensity $\dot{E}_{mv}$.

Figure 17 is a sketch showing vector fields produced by the special type of elliptically polarized transmitting antenna of Equation 2.

In Equation 2 let $|E_m| = |E_{mh}| = |E_{mv}|$, $\psi_h = 0°$ and $\psi_v = 90°$ Making these substitutions, $$\dot{E} = E_m \cos\theta(\sin\omega t + J\cos\omega t) \quad (3)$$

This is the equation of a circularly polarized vector $\dot{E}$ which rotates clockwise, as shown in Figure 18, in a plane at right angles to the direction of propagation.

Now in Equation 2 let $|E_m| = |E_{mh}| = |E_{mv}|$, $\psi_h = 180°$ and $\psi_v = 90°$ Making these substitutions, $$\dot{E} = E_m \cos\theta(-\sin\omega t + J\cos\omega t) \quad (4)$$

This is the equation of a circularly polarized vector $\dot{E}$ which rotates counterclockwise, in a plane at right angles to the direction of propagation, as shown in Figure 19.

The direction of rotation from clockwise to counter-clockwise can be accomplished by reversing the leads to the horizontal loop radiating element. This effect could also have been accomplished by reversing the conenctions to the vertical dipole. If the connections to both the horizontal and vertical elements are reversed the direction of rotation will not be altered.

In Equation 2 let $|E_m| = |E_{mh}| = |E_{mv}|$, and $\psi_h = \psi_v = 90°$

With these substitutions, $$\dot{E} = E_m \cos\theta \cos\omega t(1+J) \quad (5)$$

which is the equation of +45 degree polarization as shown in Figure 20.

If in Equation 2

$|E_m| = |E_{mh}| = |E_{mv}|$, $\psi_h = 270°$ and $\psi_v = 90°$ which if substituted yields, $$\dot{E} = E_m \cos\theta \cos\omega t(J-1) \quad (6)$$

which is the equation of −45 degrees polarization as shown in Figure 21.

Diagonal polarization results when the vectors $\dot{E}_{mh}$ and $\dot{E}_{mv}$ are in phase or exactly out of phase giving respectively positive or negative diagonal polarization. 45° diagonal polarization is produced when $|E_{mh}| = |E_{mv}|$.

If $|E_{mh}| < |E_{mv}|$ in the case of diagonal polarization the angle of polarization as measured from the vertical can be varied from 0 to 45° as the ratio $$\frac{E_{mh}}{E_{mv}}$$

varies from 0 to 1. Now if $|E_{mh}| > |E_{mv}|$ the angle of polarization as measured from the vertical can be varied from 45° to 90° as the ratio $$\frac{E_{mh}}{E_{mv}}$$

varies from 1 to ∞.

So far we have considered the special case of circular polarization and all cases of diagonal polarization. These are all special cases of elliptical polarization.

If the phase between $\dot{E}_{mh}$ and $\dot{E}_{mv}$ is 90° but $|E_{mh}| < |E_{mv}|$ then elliptical polarization with major axis vertical and minor axis horizontal as shown in Figure 22 results. If $|E_{mh}| > |E_{mv}|$ then the major axis is horizontal and the minor axis is vertical as shown in Figure 23. These two cases of elliptical polarization are for clockwise rotation because $\psi_h = 0°$ and $\psi_v = 90°$. If $\psi_h$ is reversed, that is, made 180°, then counter-clockwise rotation will result.

Elliptical polarization with the major axis at any angle between 0° and 90° can be produced by properly selecting the magnitudes of the vectors $\dot{E}_{mh}$ and $\dot{E}_{mv}$ and properly selecting the phase angles $\psi_h$ and $\psi_v$.

In all of the above cases for the two element elliptically polarized antenna the polarization and field intensity does not vary in the horizontal plane.

Consider the following special application of Equation 1 for a three element circularly polarized antenna, $$\dot{E} = \dot{E}_{m1}\cos\omega t + \dot{E}_{m2}\cos(\omega t + 120) + \dot{E}_{m3}\cos(\omega t + 240) \quad (7)$$

where $\dot{E}_{m1}$, $\dot{E}_{m2}$ and $\dot{E}_{m3}$ are vectors produced by a three phase antenna as shown in Figures 11, 12 and 24. At various times in a cycle the following table gives the solution of Equation 1 and shows that the field is circularly polarized and rotates in a clockwise direction:

| $t$ | $\dot{E}$ | |
|---|---|---|
| 0 | 1.5 | /90° |
| 120 | 1.5 | /330° |
| 240 | 1.5 | /210° |

Elliptical polarization has been described as the general case, with plane polarization and circular polarization as the two limiting cases thereof. To produce plane polarization, the radiator means that produce the two wave polarization planes must be fed in phase, that is, in a zero phase relationship. To effect circular polarization, the phase relationship between the radiator means must be proportional to the angle between the planes of polarization. A formula may be used to express the phase relationship necessary between the radiator means. This formula may be expressed as:

Electrical phase angle~$2\pi n \pm A$ where A is the dihedral angle between the planes of polarization and is expressed in radians, and $n$ is any positive integer including 0.

To express the phase relationship in the general case of elliptical polarization, and to include the two limiting cases of circular polarization and plane polarization, the relationship may be expressed as: the electrical phase relationship between said radiator means is a function of a variable having limits $2\pi n \pm A$ and 0.

The relative magnitudes of energization is critical in the case of circular polarization, where the radiator means must be energized at the same relative magnitude. For either elliptical polarization or plane polarization, the magnitudes of energization may be of any relative value.

In the present specification and claims, the term "circular polarization" shall be defined to include true circles as well as ellipses in which the major axis thereof is not more than substantially 20 per cent greater length than the minor axis.

Although I have described my invention with a certain degree of particularity in its preferred form, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A radiation system to effect plane polarization in at least a first plane of an electromagnetic field created by radiating electromagnetic energy, said system comprising electromagnetic energy producing means having at least first and second relatively variable output means, at least first and second radiator means for establishing first and second wave polarization planes, means to energize said radiator means from said correspondingly numbered output means, and means to energize said radiator means in phase and at any relative magnitude of energization.

2. A radiation system to effect substantially uniform plane polarization in at least a first plane of an electromagnetic field created by radiating electromagnetic energy, said system comprising electromagnetic energy producing means having at least first and second relatively variable output means, at least first and second radiator means for establishing first and second wave polarization planes, each of said radiator means establishing substantially identical fields in said first plane, means to energize said radiator means from said correspondingly numbered output means, and means to energize said radiator means in phase and at any relative magnitude of energization.

3. A radio system comprising at least a radio receiving set and first and second radio transmitting sets, means for radiating from the first and second radio transmitting sets first and second energy waves nondirectional in the horizontal plane, said energy waves having substantially equal components in the horizontal and vertical planes in all directions in the horizontal plane, receptor means at said radio receiving set capable of receiving said first and second energy waves, said energy waves at said radio receiving set having a difference in azimuthal direction or characteristic of polarization, and a combination of phase connecting and directional means at the said receptor means for discriminating between said first and second energy waves.

4. A radiation system including first and second electromagnetic waves at least one of which is being radiated from a source substantially nondirectional in the horizontal plane, said waves having substantially equal horizontal and vertical components in all directions in the horizontal plane, receiving means upon which both waves are adapted to impinge, and a combination of spacing, phasing and directional control means at said receiving means to discriminate between a characteristic difference in the azimuthal direction and polarization of said waves.

5. A radio system comprising, at least a radio receiver and a radio transmitter, means for radiating from said transmitter radio energy waves which are substantially circularly polarized in all directions of radiation in at least a given plane and which have a given rotational direction, receptor means at said receiver capable of receiving said circularly polarized energy waves of said given rotational direction, and means at said receptor means for selectively rejecting circularly polarized waves of the opposite rotational direction.

6. A radio system comprising, at least a radio receiver and a radio transmitter, means for radiating from said transmitter radio energy waves which in all directions of radiation are substantially diagonally plane polarized with an attitude in at least a first plane at a given acute angle to the first plane and which attitude remains substantially constant in said first plane relative to radii from said transmitter, receptor means at said receiver capable of receiving said diagonally polarized energy waves of said given acute angle of polarization, and means at said receptor means for selectively rejecting diagonally polarized waves polarized in a plane perpendicular to said plane of polarization at said given acute angle.

7. A radio system comprising, at least a radio receiver and a radio transmitter, means for radiating from said transmitter radio energy waves which in all directions of radiation are elliptically polarized and which have a given rotational direction and which ellipse remains substantially constant in shape and attitude of the major axis relative to radii from said transmitter in at least a first plane, receptor means at said receiver capable of receiving said elliptically polarized energy waves of said given rotational direction, shape and attitude, and means at said receptor means for selectively rejecting elliptically polarized energy waves having a difference in one of said rotational direction, shape and attitude from said receivable elliptically polarized energy wave.

8. A radiation system to effect in at least a first plane an electromagnetic field which in all directions of radiation is established by an elliptically polarized energy wave of a given shape and attitude, said system comprising, electromagnetic energy producing means having at least first and second relatively variable output means, at least first and second radiator means having respectively first and second wave polarization planes, said first and second wave polarization planes having a given angle A therebetween, said radiator means adapted to establish substantially identical fields in said first plane, means to energize said radiator means from said correspondingly numbered output means, means to energize said first and second radiator means in phase relationship as a function of a variable having limits of $2\pi n \pm A$ and 0, where A is expressed in radians and $n$ is any positive integer, means to energize said radiator means in equal magnitudes of energization and establishing said variable at said first named limit of $2\pi n \pm A$ to effect substantially circular polarization of the radiated wave in all directions of radiation, means to energize said radiator means in any relative magnitude of energization and establishing said variable at said second named limit of zero to effect substantially plane polarization of the radiated waves in all directions of radiation which waves in at least said first plane have an attitude at a given acute angle to the first plane and which attitude remains substantially constant relative to radii from said radiator means, and means to energize said radiator means at any relative magnitude of energization and any value of the variable between the said limits to effect elliptical polarization of the radiated wave which in at least said first plane has a given shape and attitude.

9. An antenna system for electromagnetic energy transducer means having first and second connection means, said system comprising, first and second antenna means having respectively first and second wave polarization planes, said first and second wave polarization planes having a given angle A therebetween other than zero, said antenna means having substantially identical field patterns in at least a given plane, means to couple said first and second antenna means to said first and second connection means, respectively, in a phase relationship as a function of a variable having limits of $2\pi n \pm A$ and zero, where A is expressed in radians and $n$ is any positive integer, and means to couple said first and second antenna means to said first and second connection means, respectively, with equal conductance and to establish said variable at said first named limit of $2\pi n \pm A$ to condition said antenna means for substantially circular polarization of the electromagnetic energy waves in said given plane in all directions from said antenna means.

10. An antenna system for electromagnetic energy transducer means having first and second connection means, said system comprising, first and second antenna means having respectively first and second wave polarization planes, said first and second wave polarization planes having a given angle A therebetween other than zero, said antenna means having substantially identical field patterns in at least a given plane, means to couple said first and second antenna means to said first and second connection means, respectively, in a phase relationship as a function of a variable having limits of $2\pi n \pm A$ and zero, where A is expressed in radians and $n$ is any positive integer, and means to couple said first and second antenna means to said first and second connection means, respectively, with any relative value of conductance and to establish said variable at said second named limit of zero to condition said antenna means for substantially plane polarization of the electromagnetic energy waves of a substantially constant attitude in said given plane in all directions from said antenna means.

11. An antenna system for electromagnetic energy transducer means having first and second connection means, said system comprising, first and second antenna means having respectively first and second wave polarization planes, said first and second wave polarization planes having a given angle A therebetween other than zero, said antenna means having substantially identical field patterns in at least a given plane, means to couple said first and second antenna means to said first and second connection means, respectively, in a phase relationship as a function of a variable having limits of $2\pi n \pm A$ and zero, where A is expressed in radians and $n$ is any positive integer, and means to couple said first and second antenna means to said first and second connection means, respectively, with any relative value of conductance and any value of the variable between said limits to condition said antenna means for substantially elliptical polarization of the electromagnetic energy waves of a substantially constant shape and attitude in said given plane in all directions from said antenna means.

12. In an electromagnetic energy radiating system, the method of producing substantially uniform plane polarization in at least a given plane of the electromagnetic field created thereby, comprising, radiating a first electromagnetic wave in a first wave polarization plane to create a first field pattern in at least said given plane, radiating a second electromagnetic wave in a second wave polarization plane to create in at least said given plane a second field pattern substantially identical to said first field pattern, and establishing said radiations in an in-phase relationship.

CARL E. SMITH.

REFERENCES CITED

The following references are of record in the file of this patent:

UNITED STATES PATENTS

| Number | Name | Date |
| --- | --- | --- |
| 1,841,654 | Korschenewsky | Jan. 19, 1932 |
| 1,892,221 | Runge | Dec. 27, 1932 |
| 1,934,924 | Heintz | Nov. 14, 1933 |
| 1,958,886 | Chubb | May 15, 1934 |
| 1,974,545 | Salto | Sept. 25, 1934 |
| 2,174,353 | Roberts | Sept. 26, 1939 |
| 2,312,799 | Carter | Mar. 2, 1943 |